United States Patent
Sawers et al.

(10) Patent No.: US 6,581,531 B2
(45) Date of Patent: Jun. 24, 2003

(54) HAND HELD SEED PLANTING DEVICE AND METHOD FOR USE

(76) Inventors: Charles H. Sawers, 1832 cr 329, Floresville, TX (US) 78114; William R. Sawers, 1832 CR 329, Floresville, TX (US) 78114

( * ) Notice: Subject to any disclaimer, the term of this patent is extended or adjusted under 35 U.S.C. 154(b) by 69 days.

(21) Appl. No.: 09/956,728

(22) Filed: Sep. 20, 2001

(65) Prior Publication Data

US 2002/0092450 A1 Jul. 18, 2002

Related U.S. Application Data

(60) Provisional application No. 60/234,073, filed on Sep. 20, 2000.

(51) Int. Cl.[7] .............................................. A01B 45/02
(52) U.S. Cl. ..................................................... 111/106
(58) Field of Search ........................... 111/106–108, 82, 111/92–98

(56) References Cited

U.S. PATENT DOCUMENTS

| | | | | | |
|---|---|---|---|---|---|
| 2,325,939 A | * | 8/1943 | Buehler | ...................... | 111/92 |
| 3,170,422 A | * | 2/1965 | Gregory | ...................... | 111/96 |
| 3,517,629 A | * | 6/1970 | Bridges et al. | ............. | 111/106 |
| 3,771,474 A | * | 11/1973 | Elston | .......................... | 111/96 |
| 4,614,160 A | * | 9/1986 | Curlett | ......................... | 111/96 |
| 4,736,694 A | * | 4/1988 | Kratky et al. | ............... | 111/106 |
| 5,924,369 A | * | 7/1999 | Hatcher | ........................ | 111/92 |

* cited by examiner

*Primary Examiner*—Robert E. Pezzuto
(74) *Attorney, Agent, or Firm*—Cline H. White; Jackson Walker L.L.P.

(57) ABSTRACT

The present invention is a hand held, seed planting device for use by individuals. It is comprised of a soil probe for insertion into the earth, a seed feed conduit, and a movable clearing rod that slides through the soil probe. The clearing rod is used to clean the probe and embed the seeds in the earth. An adjustable depth gauge on the probe allows for the consistent, measured insertion of the seeds into the soil without stooping.

3 Claims, 3 Drawing Sheets

HAND HELD SEED PLANTING DEVICE AND METHOD FOR USE

This application claims benefit of provisional application Ser. No. 60/234,073, filed Sep. 20, 2000.

BACKGROUND OF THE INVENTION

Field of the Invention

The present invention relates to an hand held seed planting device for use by individuals. Specifically, the invention relates to a hand held device that allows for the measured insertion, application of a limited number of seeds, and the urging of the seeds in contact with the soil. It further relates to the method for using said device.

Background Information

The home gardener often finds planting seeds a difficult and cumbersome chore. The gardener must insert individual seeds into the soil along furrows or in desired points in the garden. This requires an inordinate amount of stooping which can be uncomfortable or detrimental to the health of the gardener.

Others have attempted to create a hand held seed planter, however, none have successfully combined all of the elements of the present invention that are desirable for the device. In order to solve all of the difficulties inherent in a hand held seed planting device, the desirable device should be light weight, easily held and carried, permit planting of seeds without stooping, provide for the insertion of seeds at a desired depth in the ground, and allow the user to firmly contact the seed into the dirt.

SUMMARY OF THE INVENTION

The present invention includes a soil probe for insertion into the earth to create a hole for the seed, and a seed feed conduit that allows the user to drop a desired number of seeds through the conduit which connects with the soil probe allowing the seeds to drop into the created hole. The soil probe and seed feed conduit are of a length that allows the user to insert the soil probe tip into the earth without stooping. The soil probe also has an internal, movable clearing rod that keeps soil from entering and clogging the soil probe tip. Additionally, the clearing rod is used to firmly embed the seeds in the earth. The soil probe tip is equipped with a slideable, adjustable depth gauge which can be adjusted by the user such that the seeds are planted at a uniform, desired depth in the earth.

DETAILED DESCRIPTION OF THE PREFERRED EMBODIMENT

Figure 1:
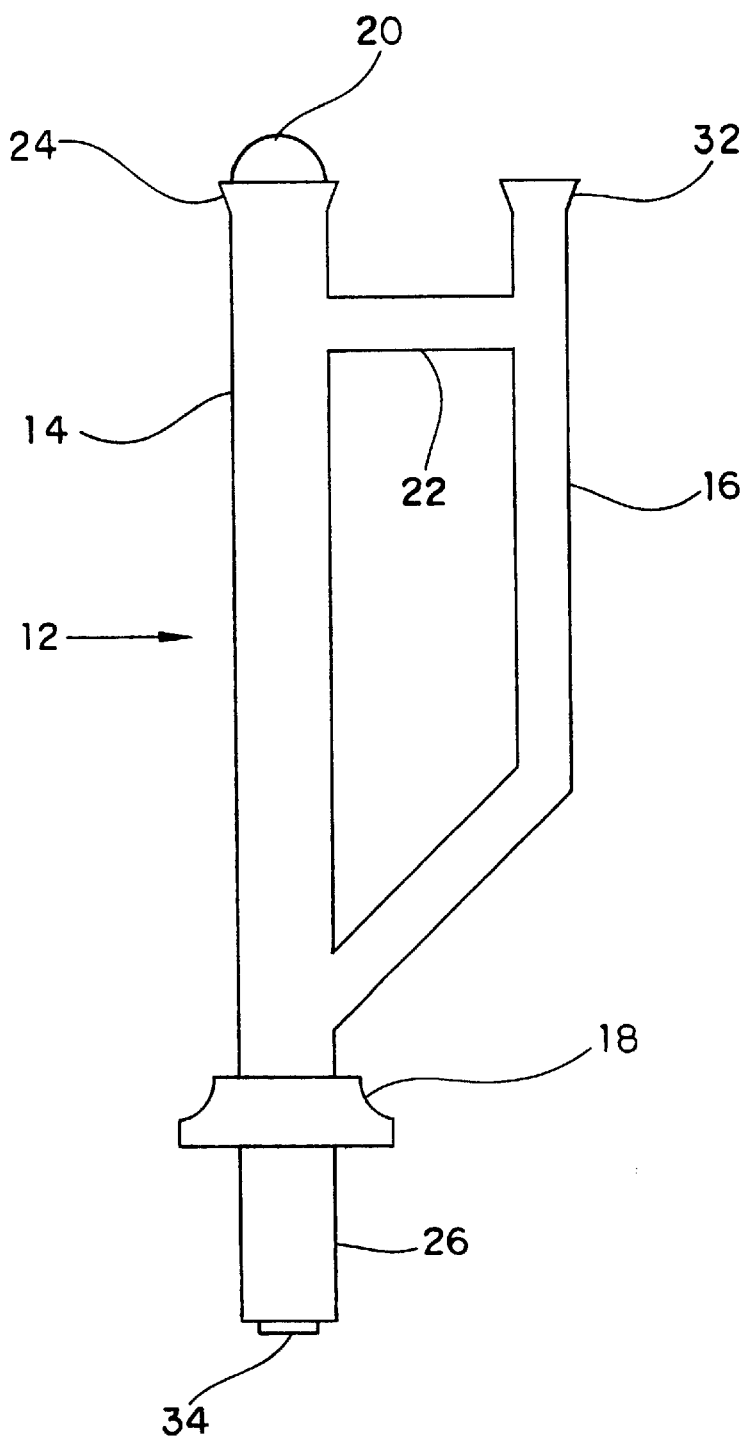
FIG. 1 shows a side view of the present invention.

Turning to the figures, FIG. 1 shows a side view of the present invention. The hand held seed planter (12) is held in a generally upright position with the soil probe tip (26) inserted by the user into the soil. A separate feed conduit (16) is connected to the lower end of the soil probe (14). The interior of the seed feed conduit (16) is in communication with the interior of the soil probe (14). At the end of the seed feed conduit (16) opposite its connection to the soil probe (14), is a seed cup (32). The seed cup (32) essentially acts as a funnel for the seeds in order that it is easier for the user to insert seeds into the seed feed conduit (16). At the opposite end of the soil probe (14) from the soil probe tip (26) is a handle (22). The handle (22) allows the user to more easily carry the hand held seed planter (12) and insert the soil probe tip (26) into the earth. Also shown is a depth gauge (18). The depth gauge (18) is adjustable along the length of the soil probe tip (26). The depth gauge (18) allows the user to choose the depth at which the seeds will be planted. The depth gauge (18) is slideably attached to the soil probe tip (26). Also shown in this figure are the soil clearing rod knob (20) and the clearing rod tip (34). The clearing rod knob (20) acts to prevent the soil clearing rod (28) (not shown in this figure) from sliding through the interior of the soil probe (14) and dropping away from the hand held seed planter (12). The clearing rod tip (34) is generally held at or near the soil probe tip (26). The clearing rod tip (34) acts to prevent soil from entering and clogging the interior of the soil probe tip (26), and it presses the planted seeds firmly in contact with the soil.

Figure 2:
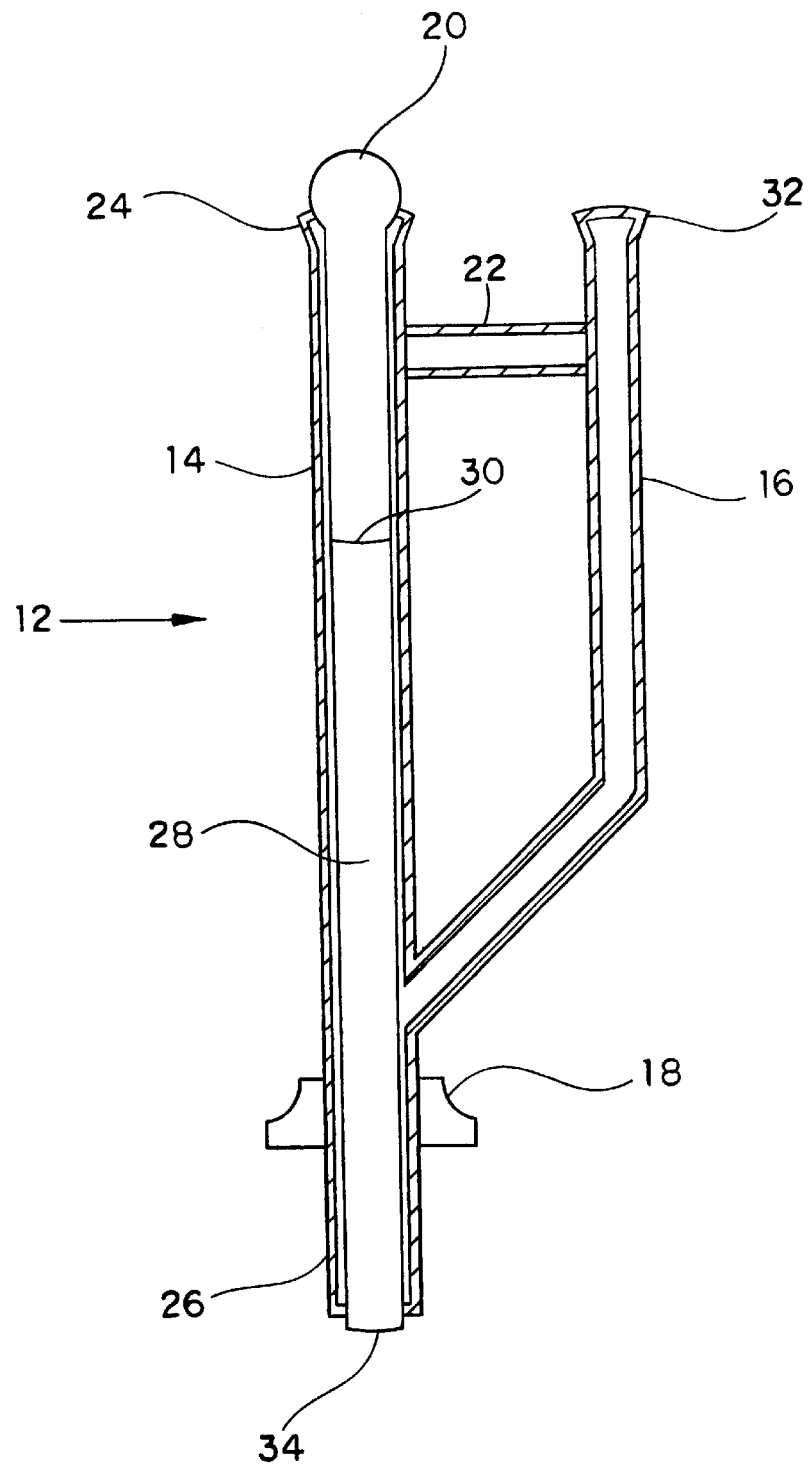
FIG. 2 is a transverse sectional, side view of the present invention.

FIG. 2 shows a transverse cross-action of the hand held seed planter (12) with the soil clearing rod (28) in its down position. This figure shows the soil clearing rod (28) extending the entire length through the interior of the soil probe (14). The knob protector lip (24) acts to stop the soil clearing rod (28) by contacting the clearing rod knob (20). The knob protector lip (24) further acts to protect the clearing rod knob (20) by providing a more broad service for contact with the clearing rod knob (20). This figure further illustrates the communication between the seed feed conduit (16) and the soil probe (14). When the soil clearing rod (28) is in the down position, seeds that are dropped in the seed cup (32) down through the seed feed conduit (16) are generally blocked by the soil clearing rod (28) at the connection between the seed feed conduit (16) and the soil probe (14).

Figure 3:
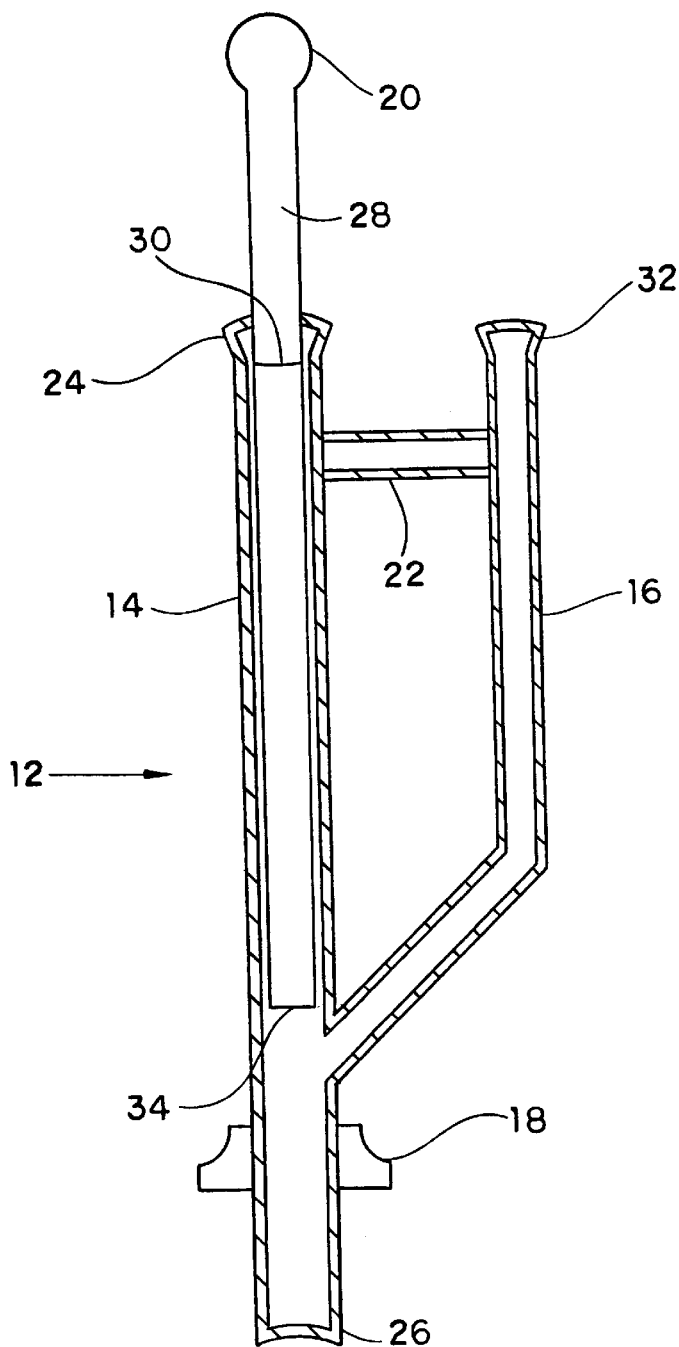
FIG. 3 is a transverse sectional, side view of the present invention.

FIG. 3 is a transverse section of the hand held seed planter (12) showing the soil clearing rod (28) in an up position. At this position the user has raised the clearing rod knob (20) to such an extent that the clearing rod tip (34) rises above the connection between the seed feed conduit (16) and the soil probe (14). This allows seeds which are dropped in the seed cup (32) to fall through the interior of the seed feed conduit (16) into the interior of the soil probe (14) and finally falling against the earth at the soil probe tip (26).

In order to use the present invention, the user will set the depth gauge (18) at a desired point along the soil probe tip (26) such that the soil probe tip (26) extends into the earth a desired distance when the soil probe tip (26) is inserted up to the level of the depth gauge (18). The depth gauge (18) may take a number of embodiments such as having a set screw or pin to allow the depth gauge (18) to be slideably attached along the length of the soil probe tip (26). Once set, the user grasps the present invention by the handle (22) and moves through the planting area. At those points at which the user wishes to plant a seed, the user presses the soil probe tip (26) into the earth up to the depth of the depth gauge (18). The user then lifts the clearing rod knob (20) which pulls the soil clearing rod (28) upwardly through the soil probe (14). The clearing knob rod (20) is lifted until the clearance mark (30) is seen level with the knob protector lip (24). By raising the clearing rod knob (20) this amount, the user is assured that the clearing rod tip (34) lies above the junction of the seed feed conduit (16) and the soil probe (14). This allows seeds dropped through the seed feed conduit (16) to enter the soil probe (14) without being impeded by the soil clearing rod (28). Once the soil clearing rod (28) is out of the way, the user drops one or more seeds into the seed cup (32). The seeds then drop through the seed feed conduit (16) and into the soil probe (14) then dropping to the earth at the opening of the soil probe tip (26). The user may then remove the present invention from the earth and the seeds will be left at the desired depth, however, it is often desirable to firmly embed the seeds with the earth. Therefore, the user may choose to push the clearing rod knob (20) back down against the knob protector lip (24) which in turn moves the soil clearing rod (28) back to its original position and presses the clearing rod tip (34) against the seeds, firmly embedding them against the soil below. The hand held seed planter (12) can then be removed and the hole filled in behind.

In an alternative method of use, the user can remove the soil clearing rod (28) from the hand held seed planter (12), or lift on the clearing rod knob (20) such that the soil clearing rod (28) remains in a position so that the clearing rod tip (34) is above the junction of the seed feed conduit (16) and the soil probe (14) junction. The user can then drag the soil probe tip (26) through the earth dropping seeds through the seed cup (32) and seed feed conduit (16) at desired intervals. As above, the seeds drop through the seed feed conduit (16), into the soil probe (14) and from there into the ground.

In each of the above methods and any other alternative methods that may be devised for the hand held seed planter (12), the hand held seed planter (12) allows the user to plants seeds without requiring the user to stoop down, the seeds are planted at a desired constant depth, the soil clearing rod (28) keeps soil and debris from clogging the soil probe tip (26), soil does not fill in the hole prior to the seed being implanted, and the seeds may be firmly contacted with the dirt by pressure from the clearing rod tip (34).

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A hand held seed planting device comprising:
   a soil probe wherein said soil probe is a length of hollow tubing;
   a seed feed conduit, wherein said seed feed conduit is a length of tubing connected at one end near a soil probe tip of said soil probe, said seed feed conduit interior being in communication with the interior of said soil probe;
   said soil probe tip capable of poking a hole in soil and holding said soil from collapsing inward until said soil probe tip is removed;
   a soil clearing rod removably insertable into the interior of said soil probe; and
   a depth gauge that is slideably attachable along the length of said soil probe tip.

2. The apparatus of claim 1 further comprising:
   a handle attached near a top end of said soil probe opposite said soil probe tip;
   said soil clearing rod having a clearance mark at a position on said soil clearing rod where when said clearance mark is substantially level with said top end of said soil probe such that said soil clearing rod is not adjacent to the point at which said seed feed conduit attaches to said soil probe.

3. A method for planting a seed in soil comprising the steps of:
   attaching a depth gauge at a desired point along a soil probe tip of a soil probe; inserting said soil probe tip into said soil to a depth where said depth gauge is substantially level with the top of said soil;
   lifting a soil clearing rod through the interior of said soil probe to a position where said clearing rod is not adjacent to an aperture created by a connection of a seed feed conduit to said soil probe;
   dropping said seed into a seed cup which is in communication with said seed feed conduit, and allowing said seed to drop from said seed cup through said seed feed conduit, into said soil probe and through said soil probe onto said soil; pressing said soil clearing rod down against said seed, urging said seed against said soil; and removing said soil probe tip from said soil.

* * * * *